Patented Mar. 18, 1930                                                          1,751,063

UNITED STATES PATENT OFFICE

PHILIP G. WRIGHTSMAN, OF CHESTER, PENNSYLVANIA, ASSIGNOR TO E. I. DU PONT DE NEMOURS & COMPANY, OF WILMINGTON, DELAWARE, A CORPORATION OF DELAWARE

NITRATED CARBOHYDRATE EXPLOSIVE AND PROCESS OF PRODUCING SAME

No Drawing.  Application filed December 7, 1927.  Serial No. 238,466.

My invention relates particularly to explosives obtained by nitrating solutions of carbohydrates in polyhydric alcohols and has for its object the production of liquid explosives possessing satisfactory properties for use in dynamites and containing higher proportions of carbohydrates than it has been practical to use heretofore.

Solutions of sugars in glycerine or in mixtures of glycerine with other polyhydric alcohols have been widely used in the manufacture of liquid explosive dynamite ingredients. The use of sugar possesses, on the one hand, the advantages of lowering the cost and depressing the freezing point of the nitrated product and, on the other hand, the disadvantages of lowering the stability and increasing the viscosity of the nitrated product, thereby making it more difficult to wash free of acid and settle to a low moisture content. In practice, a solution of about 20% sugar has been most extensively used. While efforts have been made to introduce other carbohydrates in place of sucrose, this carbohydrate in the form of cane or beet sugar is by far the most satisfactory, considering price, purity, supply, stability, yield, explosive properties, etc.

In the case of sucrose it has not been practical to use more than 20% sugar without special equipment. Even with special apparatus and the observance of special precautions, 25% sugar solution seems to be the practical maximum (U. S. Patent No. 1,478,588, granted to Ernest M. Symmes, December 25, 1923).

The factors which have limited the proportion of sugar in the past are as follows:

1. With glycerine or glycerine-diglycerine mixtures the use of more than 20% sucrose, either dissolved or suspended, gives a nitrated oil of such high viscosity that it is impractical without special equipment and process to purify, stabilize, and settle to low moisture content.

2. With glycerine-diglycerine mixtures the use of more than 20% sucrose either dissolved or suspended gives a nitrated product of undesirably low sensitiveness.

3. With glycerine, diglycerine, ethylene glycol, or mixtures of these polyhydric alcohols, the solubility of sucrose is so low that the dissolution of more than 25% cannot be accomplished without great danger of scorching the solution, and the solution, if prepared, does not stand a practical length of time without crystallization taking place.

The composition of a saturated solution of cane sugar in glycerine, ethylene glycol, or mixtures of these at normal room temperature, for example 70° F., is about 8% to 10% sugar and 92% to 90% glycerine or ethylene glycol, although super-saturated solutions containing 20% to 25% sugar will stand at room temperature considerable time before crystallizing. The preparation of a solution of more than 25% sugar in glycerine, diglycerine or ethylene glycol seems impractical because the higher temperature required scorches the solution. The use of over 25% solution seems impractical because of the relatively rapid rate of crystallization at room temperature and because scorching takes place if the solution is stored above the temperature of the saturation point. Scorched solutions cause separation and washing troubles in preparing the nitrated product.

Ethylene glycol has recently become available in commercial quantities for use in the preparation of explosive oils. The introduction of this material in glycerine-sugar mixtures gives a nitrated produce of lower viscosity, which is more readily purified and which produces dynamites of increased sensitiveness. Therefore, in the presence of ethylene glycol dinitrate, larger proportions of nitrated sugars may be satisfactorily used.

Invert sugar and many of the monosaccharides are more soluble in polyhydric alcohols than sucrose. These aldohexoses and ketohexoses such as glucose, fructose, mannose, etc. are not as satisfactory as sucross owing to their low yields on nitration and the properties of the explosives produced. It is therefore desirable to obtain the full advantage of sucrose by using the practical maximum proportion and then to use a more soluble sugar in solution with the sucrose. The proportion of sucrose which it is practical to use satisfactorily in solution in a polyhydric alcohol or mixtures of polyhydric alcohols depends upon both the solubility of sucrose in the solvent and the viscosity of the solution.

I have discovered that by dissolving in a polyhydric alcohol medium a monosaccharide in addition to the sucrose, the practical maximum proportion of sucrose may be retained in solution in addition to substantial proportions of monosaccharide and that these solutions on nitration produce explosive oils suitable for use in commercial explosive compositions.

The following specific example is given to illustrate my process:—For reasons stated above, 25 parts sucrose in 75 parts ethylene glycol is the maximum proportion of sucrose which it is practical to satisfactorily use in this solvent. In applying my process a solution of 25 parts sucrose and 15 parts glucose in 60 parts ethylene glycol may be used. The solution is subjected to the action of a mixture of sulfuric and nitric acids. The nitrated product is allowed to separate in the usual way. It is drawn off and washed with water, sodium carbonate solution and sodium chloride solution. A stabilizer, such as for example diphenylamine, may be added. Additional washes, purification and stabilization may be used if desired. The nitration, purification and stabilization are essentially the same as for a 20% solution of sucrose in glycerine. The product obtained is satisfactory for use in commercial explosive compositions.

In addition to the above example, the following further illustrate compositions which may be employed in carrying out my process:—

25% sucrose
15% glucose
30% ethylene glycol
30% glycerine

20% to 25% sucrose
10% to 30% glucose
45% to 70% ethylene glycol

20% to 25% sucrose
10% to 30% glucose
20% to 60% ethylene glycol
20% to 50% glycerine In place of glucose, another monosaccharide may be used such as fructose or mannose, or a mixture of monosaccharides may be used. In place of ethylene glycol, another glycol or mixture of glycols may be used, or any polyhydric alcohol solvent such as diglycerine may be introduced.

The practical maximum proportion of sucrose will vary somewhat depending upon the polyhydric alcohol solvent and also upon the viscosity and the temperature of storage of the solution.

While I have described my invention and given detailed and specific examples, I do not limit myself to the carbohydrates and polyhydric alcohols mentioned nor to the proportions given, but include within the scope of my invention the use of any highly soluble carbohydrate which may be used in addition to sucrose in order to increase the proportion of carbohydrate while using the maximum proportion of sucrose.

I claim:

1. A process of manufacturing an explosive containing nitrated sugar, which comprises nitrating a solution of a monosaccharide and disaccharide in polyhydric alcohol, said solution containing more than 5% monosaccharide and about 25% disaccharide.

2. A process of manufacturing an explosive containing nitrated sugar, which comprises nitrating a solution of a monosaccharide and sucrose in polyhydric alcohol, said solution containing more than 5% monosaccharide and about 25% sucrose.

3. Invention of claim 2 where the monosaccharide is glucose.

4. Invention of claim 2 where the polyhydric alcohol is ethylene glycol.

5. A process of manufacturing an explosive containing nitrated sugar, which comprises nitrating a solution of about 25% sucrose and 10% to 20% glucose in a polyhydric alcohol.

6. A process of manufacturing an explosive containing nitrated sugar, which comprises nitrating a solution of about 25% sucrose and approximately 15% glucose in ethylene glycol.

7. Explosive obtained by nitrating a solution of a monosaccharide and a disaccharide in polyhydric alcohol, said solution containing more than 5% monosaccharide and about 25% disaccharide.

8. Explosive obtained by nitrating a solution of about 25% sucrose and 10% to 20% glucose in polyhydric alcohol.

9. Explosive obtained by nitrating a solution of 25 parts sucrose and 15 parts glucose in 60 parts ethylene glycol.

In testimony whereof, I affix my signature.

PHILIP G. WRIGHTSMAN.